(12) United States Patent
Cho

(10) Patent No.: US 10,984,612 B2
(45) Date of Patent: Apr. 20, 2021

(54) ELECTRONIC CONTROL UNIT AND METHOD FOR OPERATING THE SAME

(71) Applicant: MANDO CORPORATION, Gyeonggi-do (KR)

(72) Inventor: Kyung Ran Cho, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 184 days.

(21) Appl. No.: 16/261,463

(22) Filed: Jan. 29, 2019

(65) Prior Publication Data

US 2019/0236864 A1 Aug. 1, 2019

(30) Foreign Application Priority Data

Jan. 30, 2018 (KR) .................. 10-2018-0011221

(51) Int. Cl.
*G07C 5/08* (2006.01)
*G01P 3/00* (2006.01)

(52) U.S. Cl.
CPC .............. *G07C 5/0808* (2013.01); *G01P 3/00* (2013.01); *G07C 5/0816* (2013.01)

(58) Field of Classification Search
CPC .. G01P 3/00; G01P 15/00; G01P 15/16; G06F 11/181; G06F 11/18; G06F 11/182; G06F 11/183; G06F 11/184; G06F 11/2023; G06F 11/2025; G06F 11/2028; G06F 11/203; G06F 11/2035; G05D 1/00; G05D 1/0077; B60W 2050/029; B60W 2050/0292; B60W 2050/023; B60W 20/50; B60W 50/02; B60W 50/022; B60W 50/0205; B60L 3/00; B60L 3/003; B60L 3/0046; B60L 3/0061; B60L 3/0076; B60L 3/0092; B60L 3/0084; B60L 15/20; B60L 15/2009; B60L 15/2018; B60L 15/2027; B60L 15/2036; B60L 15/2054; B60L 2220/46; B60L 2260/28; B60L 53/00; B60L 53/12; B60L 58/00; B60L 58/10; B60C 23/00; B60C 23/0422; B60C 23/0418; B60C 23/061; G05B 2219/00; G05B 2219/24; G05B 2219/24044; G01R 31/3275; B60T 8/80; B60T 8/88; B60T 17/20; B60T 17/22; G07C 5/00; G07C 5/08; G07C 5/0808; G07C 5/0816
USPC .................................. 701/22, 34.3
See application file for complete search history.

(56) References Cited

U.S. PATENT DOCUMENTS 5,483,452 A * 1/1996 Tanaka ................. B60T 8/885
701/70
2013/0268798 A1* 10/2013 Schade ............... G06F 11/1487
714/3

FOREIGN PATENT DOCUMENTS

KR 10-2016-0127942 11/2016

* cited by examiner

*Primary Examiner* — Anthony R Jimenez
(74) *Attorney, Agent, or Firm* — Ladas & Parry, LLP

(57) ABSTRACT

An electronic control unit (ECU) includes a first signal processor and a second signal processor. The first signal processor selectively receives current wheel speed information detected by a sensing device, detects a signal of the current wheel speed information, and processes the detected signal. The second signal processor communicates with the first signal processor, selectively receives the current wheel speed information detected by the sensing device when the first signal processor is in a faulty state, and detects and processes a signal of the current wheel speed information.

14 Claims, 8 Drawing Sheets

ELECTRONIC CONTROL UNIT AND METHOD FOR OPERATING THE SAME

CROSS-REFERENCE TO RELATED APPLICATION

This application is based on and claims priority under 35 U.S.C. § 119 to Korean Patent Application No. 2018-0011221, filed on Jan. 30, 2018 in the Korean Intellectual Property Office, the disclosure of which is incorporated by reference in its entirety.

BACKGROUND

1. Field

Embodiments of the present disclosure relate to an electronic control unit (ECU) and a method for operating the same.

2. Description of the Related Art

Generally, a conventional electronic control unit (ECU) receives a sensing signal of a wheel speed sensor and determines the presence or absence of a fault in the wheel speed sensor based on the received signal.

For example, a representative example of the above-mentioned ECU has been disclosed in Korean Patent Laid-Open Publication No. 10-2016-0127942 (2016.11.07) that describes a fault detection apparatus of a wheel speed sensor and a method for the same in which an ECU can determine the presence or absence of a fault in a wheel speed sensor when a speed change of wheels is higher than a reference speed change.

However, the above-mentioned conventional fault detection apparatus and method of the wheel speed sensor have difficulty in stably operating the ECU, such that it is difficult to prevent traffic accidents from occurring in advance.

Therefore, many developers and companies are conducting intensive research into an improved ECU and a method for operating the same in which a vehicle can be stably controlled through stable operation of the ECU such that occurrence of traffic accidents can be prevented in advance.

In recent times, in order to reduce a maintenance time needed to maintain a signal processor for processing signals, other improved ECUs and methods for operating the same have been intensively researched and discussed.

CITED REFERENCE

Patent Document

Korean Patent Laid-Open Publication No. 10-2016-0127942 (2016.11.07)

SUMMARY

Therefore, it is an aspect of the present disclosure to provide an ECU for stably controlling a vehicle and maintaining such stable control of the vehicle, and a method for operating the same.

It is another aspect of the present disclosure to provide an ECU for preventing occurrence of traffic accidents in advance and a method for operating the same.

It is another aspect of the present disclosure to provide an ECU for suppressing increase in maintenance costs and a method for operating the same.

Additional aspects of the invention will be set forth in part in the description which follows and, in part, will be obvious from the description, or may be learned by practice of the invention.

In accordance with an aspect of the present disclosure, the ECU includes a first signal processor and a second signal processor. The first signal processor selectively receives current wheel speed information detected by a sensing device, detects a signal of the current wheel speed information, and processes the detected signal. The second signal processor communicates with the first signal processor, selectively receives the current wheel speed information detected by the sensing device when the first signal processor is in a faulty state, and detects and processes a signal of the current wheel speed information.

The first signal processor may include a first switching module configured to provide the current wheel speed information detected by the sensing device through turn-ON switching thereof, a first detector configured to receive the current wheel speed information through the turn-ON switching of the first switching module, and detect the signal of the current wheel speed information, and a first controller configured to transmit a turn-ON switching command to the first switching module, transmit a detection command to the first detector, determine whether at least one of a turn-ON switching state of the first switching module and a detection state of the first detector is in a faulty state, and transmit a signal processing command to the second signal processor when the at least one of the turn-ON switching state of the first switching module and the detection state of the first detector is in the faulty state, such that the second signal processor performs signal processing.

The second signal processor may include a second switching module configured to provide the current wheel speed information detected by the sensing device through turn-ON switching thereof, a second detector configured to receive the current wheel speed information through the turn-ON switching of the second switching module, and detect the signal of the current wheel speed information, and a second controller configured to communicate with the first controller, and transmit a turn-ON switching command to the second switching module while simultaneously transmitting a detection command to the second detector upon receiving the signal processing command from the first controller, such that the second controller detects and processes the signal of the current wheel speed information.

The second signal processor may determine whether the signal processing command has been received from the first controller by periodically communicating with the first controller.

The second signal processor and the first signal processor may be configured in a manner that information about a faulty state of at least one of a turn-ON switching state of a first switching module and a detection state of a first detector is communicated between the second signal processor and the first signal processor, wherein the turn-ON switching state of the first switching module and the detection state of the first detector are provided to the first signal processor.

When the first signal processor is in a faulty state, the first controller may further transmit a first identification command for identifying the faulty state of the first signal processor to an identification device.

When the turn-ON switching state of the first switching module is in the faulty state, the first controller may further transmit a second identification command for identifying that the turn-ON switching state of the first switching module is in the faulty state to an identification device.

When the detection state of the first detector is in the faulty state, the first signal may further transmit a third identification command for identifying that the detection state of the first detector is in the faulty state to an identification device.

In accordance with another aspect of the present disclosure, a method for operating an electronic control unit (ECU) includes selectively receiving, by a first signal processor, current wheel speed information detected by a sensing device, detecting and processing, by the first signal processor, a signal of the current wheel speed information, allowing the first signal processor to communicate with the second signal processor, selectively receiving, by the second signal processor, current wheel speed information detected by the sensing device when the first signal processor is in a faulty state, and detecting and processing, by the second signal processor, a signal of the current wheel speed information.

The method may further include providing the current wheel speed information detected by the sensing device through turn-ON switching of a first switching module of the first signal processor, receiving the current wheel speed information from a first detector of the first signal processor through turn-ON switching of the first switching module, detecting, by the first detector, the signal of the current wheel speed information, determining, by a first controller of the first signal processor, whether at least one of a turn-ON switching state of the first switching module and a detection state of the first detector is in a faulty state, and when the faulty state is decided by the first controller, transmitting, by the first controller, a signal processing command to the second signal processor such that the second signal processor performs signal processing.

The method may further include, allowing a second controller of the second signal processor to communicate with the first controller, when the second controller receives the signal processing command from the first controller, transmitting, by the second controller, a turn-ON switching command to a second switching module of the second signal processor such that the second signal processor detects and processes the signal of the current wheel speed information, when the second switching module receives a turn-ON switching command from the second controller, allowing the second switching module to provide the current wheel speed information detected by the sensing device through turn-ON switching thereof, when the second controller receives the signal processing command from the first controller, transmitting, by the second controller, a detection command to a second detector of the second signal processor such that the second signal processor detects and processes the signal of the current wheel speed information, and when the second detector receives the detection command, receiving, by the second detector, the current wheel speed information through turn-ON switching of the second switching module, and detecting the received current wheel speed information.

The method may further include, when the second controller communicates with the first controller, determining, by the second controller, whether the signal processing command has been received from the first controller through periodic communication between the second controller and the first controller.

The method may further include, when the first controller determines a presence or absence of the faulty state, allowing information about a faulty state of at least one of the turn-ON switching state of the first switching module and the detection state of the first detector to be communicated between a first controller of the first signal processor and a second controller of the second signal processor, wherein the turn-ON switching state of the first switching module and the detection state of the first detector are provided to the first signal processor.

The method may further include, when the first signal processor is in a faulty state, transmitting a first identification command for identifying the faulty state of the first signal processor to an identification device.

The method may further include, when the turn-ON switching state of the first switching module is in the faulty state, transmitting a second identification command for identifying that the turn-ON switching state of the first switching module is in the faulty state to an identification device.

The method may further include, when the detection state of the first detector is in the faulty state, the first signal further transmits a third identification command for identifying that the detection state of the first detector is in the faulty state to an identification device.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
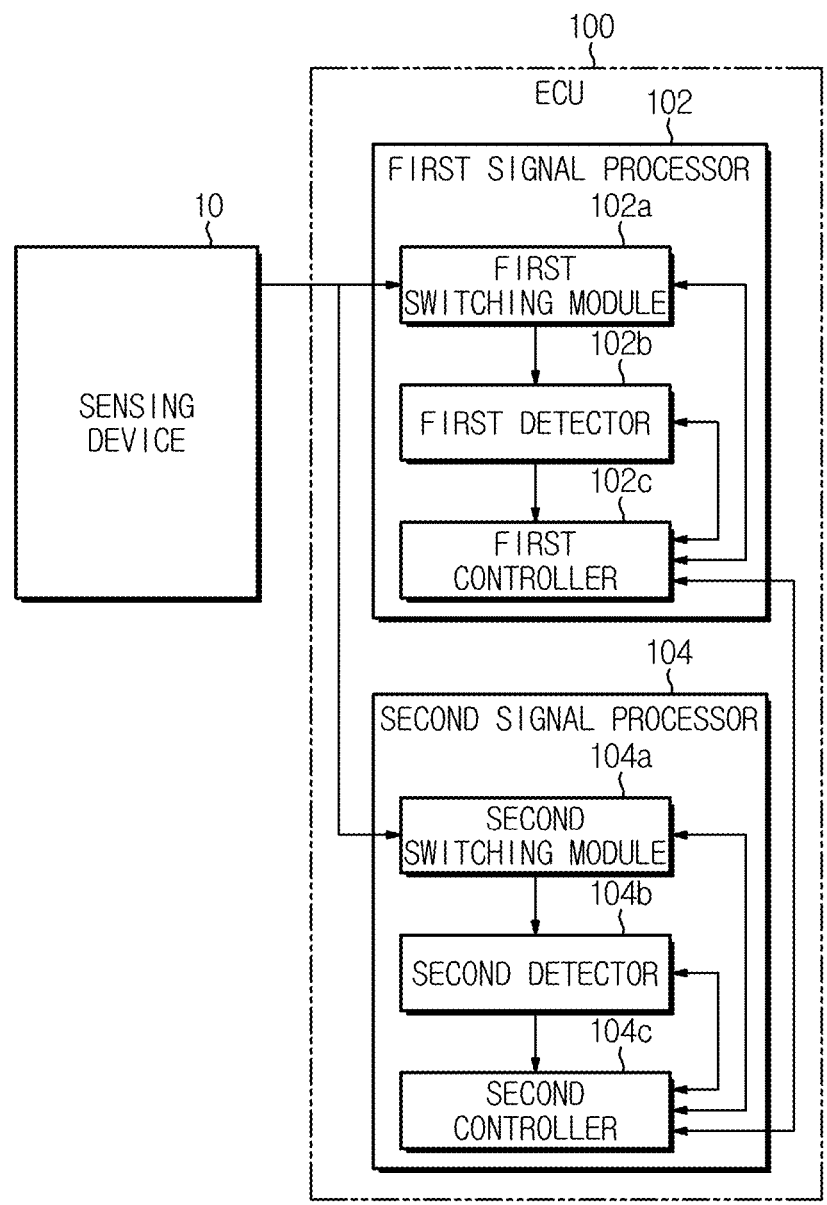
FIG. 1 is a block diagram illustrating one example of an ECU connected to a sensing device according to an embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

FIG. 1 is a block diagram illustrating one example of an ECU 100 connected to a sensing device according to an embodiment of the present disclosure.

Referring to FIG. 1, the ECU 100 may include a first signal processor 102 and a second signal processor 104.

The first signal processor 102 may selectively receive information about a current wheel speed detected by a sensing device 10, may detect a signal indicating current wheel speed information, and may process the detected signal.

In this case, although not shown in FIG. 1, the sensing device 10 may include a wheel speed sensor (not shown) to sense a current wheel speed, a front-left-wheel speed sensor (not shown), a front-right-wheel speed sensor (not shown), a rear-left-wheel speed sensor (not shown), and a rear-right-wheel speed sensor (not shown).

For example, the first signal processor 102 may include a first switching module 102a, a first detector 102b, and a first controller 102c.

The first switching module 102a may provide current wheel speed information detected by the sensing device 10 through turn-ON switching thereof.

In this case, the first switching module 102a may include at least one of a Metal-Oxide Semiconductor Field Effect Transistor (MOSFET), a Bipolar Junction Transistor (BJ), an Insulated Gate Bipolar Transistor (IGBT), a Gate Turn-Off (GTO) thyristor, a MOS Controlled Thyristor (MCT), a Silicon Controlled Rectifier (SCR) Thyristor, a mechanical relay switch, and an electronic relay switch in consideration of a switching loss rate and power consumption.

The first detector 102b may receive current wheel speed information by turn-ON switching of the first switching module 102a, and may detect a signal of the current wheel speed information.

In this case, although not shown in FIG. 1, the first detector 102b may include an Application Specific Integrated Circuit (ASIC).

The first controller 102c may transmit a turn-ON switching command to the first switching module 102a, and may transmit a detection command to the first detector 102b.

The first controller 102c may determine whether at least one of the turn-ON switching state of the first switching module 102a and a detection state of the first detector 102b is in a faulty state. When at least one of the turn-ON switching state of the first switching module 102a and the detection state of the first detector 102b is in the faulty state, the first controller 102 may transmit a signal processing command to the second signal processor 104 such that the second signal processor 104 can perform signal processing.

In this case, although not shown in FIG. 1, the first controller 102c may include a micro-control unit (MCU).

The second signal processor 104 may communicate with the first signal processor 102. When the signal processor 102 is in a faulty state, the second signal processor 104 may selectively receive current wheel speed information detected by the sensing device 10, may detect a signal of the current wheel speed information, and may thus process the detected signal.

For example, the second signal processor 104 may include a second switching module 104a, a second detector 104b, and a second controller 104c.

The second switching module 104a may be turned on such that the second switching module 104a can provide current wheel speed information detected by the sensing device 10.

In this case, the second switching module 104a may include at least one of a Metal-Oxide Semiconductor Field Effect Transistor (MOSFET), a Bipolar Junction Transistor (BJT), an Insulated Gate Bipolar Transistor (IGBT), a Gate Turn-Off (GTO) thyristor, a MOS Controlled Thyristor (MCT), a Silicon Controlled Rectifier SCR Thyristor, a mechanical relay switch, and an electronic relay switch in consideration of a switching loss rate and power consumption.

The second detector 104b may receive current wheel speed information through turn-ON switching of the second switching module 104a, and may detect a signal of the current wheel speed information.

In this case, although not shown in FIG. 1, the second detector 104b may include an Application Specific Integrated Circuit (ASIC).

The second controller 104c may communicate with the first controller 102c. Upon receiving a signal processing command from the first controller 102c, the second controller 104c may transmit a turn-ON switching command to the second switching module 104a while simultaneously transmitting a detection command to the second detector 104b such that a signal of the current wheel speed information can be detected and processed.

In this case, the second controller 104c may periodically communicate with the first controller 102c, such that the second controller 104c can determine whether the signal processing command has been received from the first controller 102c.

In this case, although not shown in FIG. 1, the second controller 104c may include a micro-control unit (MCU).

The second signal processor 104 and the first signal processor 102 of the ECU 100 according to the embodiment may communicate with each other such that a faulty state of at least one of the turn-ON switching state of the first switching module 102 and the detection state of the first detector 102b can be communicated between the second signal processor 104 and the first signal processor 102.

Figure 2:
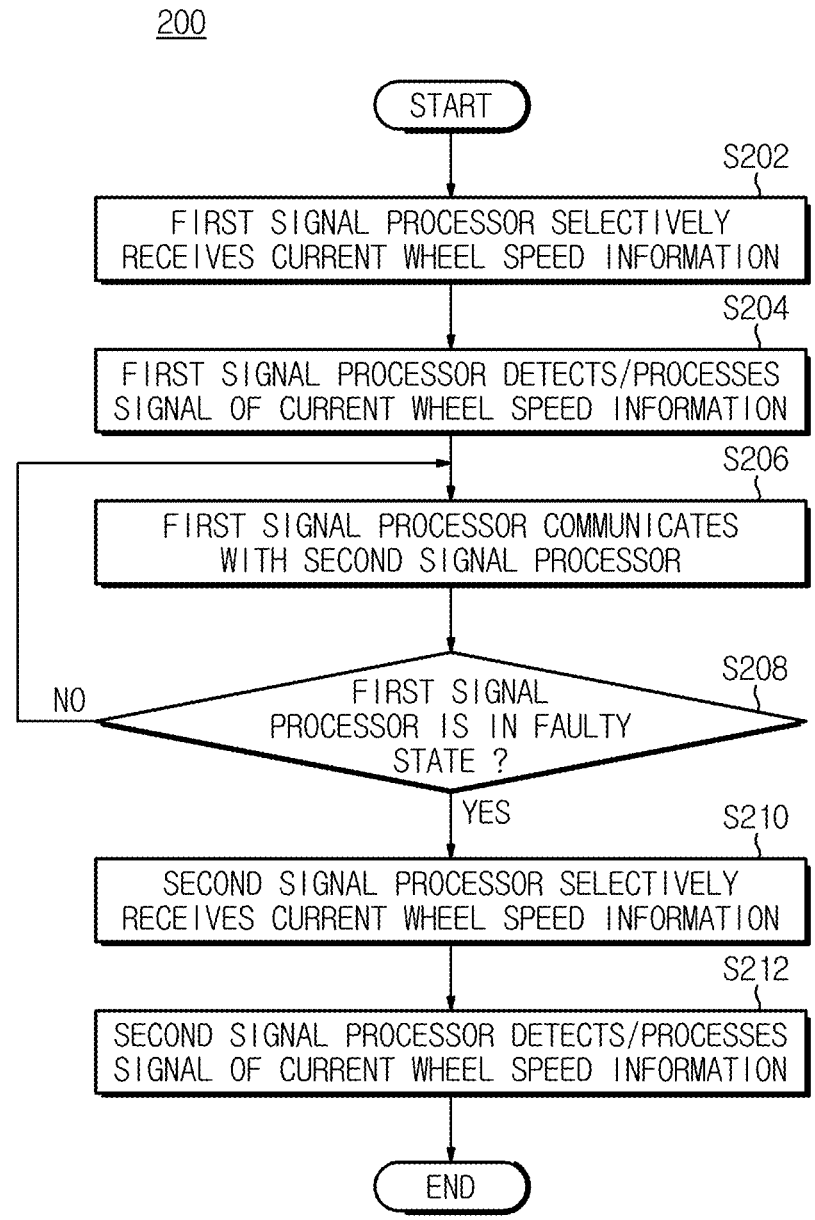
FIG. 2 is a flowchart illustrating one example of a method for operating the ECU according to an embodiment of the present disclosure.
Figure 3:
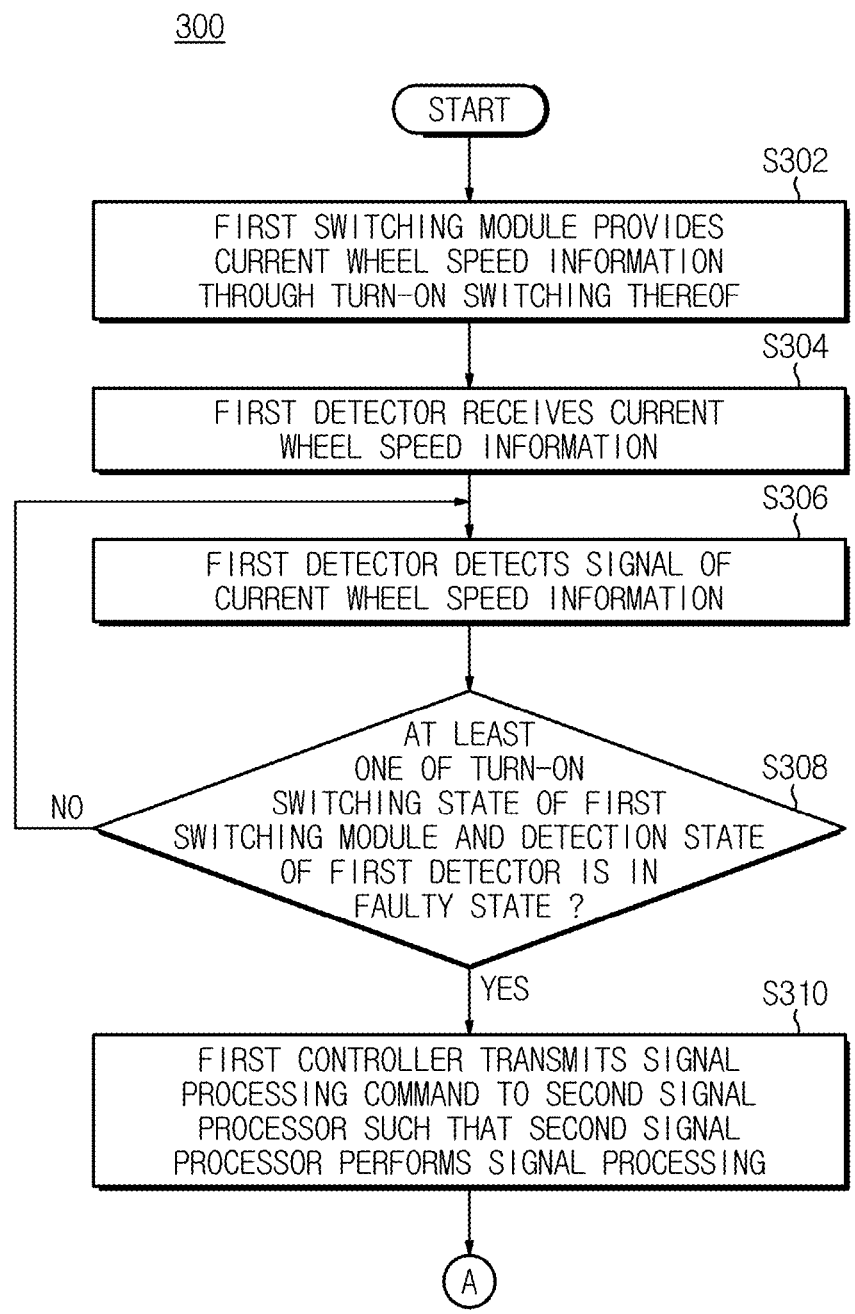
FIGS. 3 and 4 are flowcharts illustrating a method for operating the ECU according to an embodiment of the present disclosure.
Figure 4:
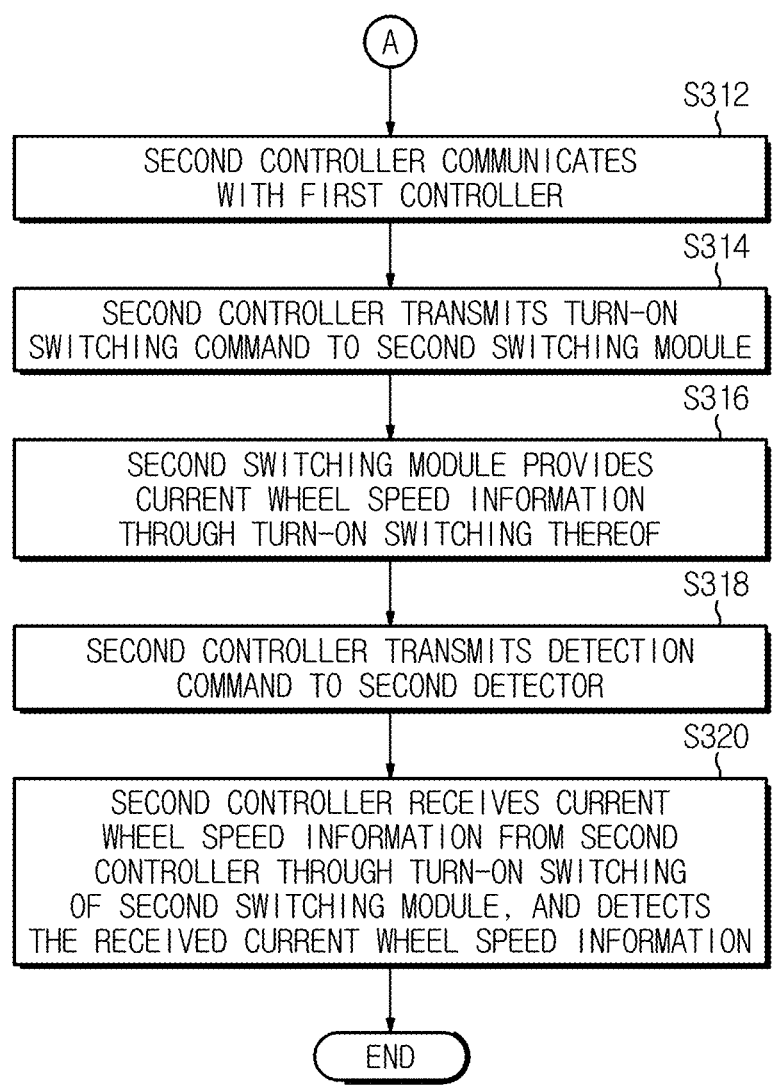

FIG. 2 is a flowchart illustrating one example of a method for operating the ECU according to an embodiment of the present disclosure. FIGS. 3 and 4 are flowcharts illustrating a method for operating the ECU according to an embodiment of the present disclosure.

Referring to FIGS. 2 to 4, a method 200 for operating the ECU may include first signal processing operations S202 and S204 and second signal processing operations S206 to S212. A method 300 for operating the ECU may include first signal processing operations S302 to S310 and second signal processing operations S312 to S320.

In the first signal processing operation S202, the ECU 100 may selectively receive current wheel speed information detected by the sensing device 10 of FIG. 1 from the first signal processor 102 of FIG. 1.

In the first signal processing operation S204, the ECU 100 may allow the first signal processor 102 of FIG. 1 to detect and process a signal of the current wheel speed information.

In the second signal processing operation S206, the first signal processor 102 of FIG. 1 may communicate with the second signal processor 104 of FIG. 1.

In the second signal processing operation S208, the second signal processor 104 of FIG. 1 may determine whether the first signal processor 102 of FIG. 1 is in a faulty state.

In the second signal processing operation S210, when the second signal processor 104 of FIG. 1 determines a faulty state of the first signal processor 102 of FIG. 2, the second signal processor 104 of FIG. 1 may selectively receive current wheel speed information detected by the sensing device 10 of FIG. 1.

In the second signal processing operation S212, the second signal processor 104 of FIG. 1 may detect a signal of the current wheel speed information, and may process the detected signal.

For example, in the first signal processing operation S302, the current wheel speed information detected by the sensing device 10 of FIG. 1 may be provided through turn-ON switching of the first switching module 102a of FIG. 1.

In the first signal processing operation S304, the ECU may receive current wheel speed information from the first detector 102b of FIG. 1 through turn-ON switching of the first switching module 102a of FIG. 1.

In the first signal processing operation S306, the first detector 102b of FIG. 1 may detect a signal of the current wheel speed information.

In the first signal processing operation S308, the first controller 102c of FIG. 1 may determine whether at least one of the turn-ON switching state of the first switching module 102a of FIG. 1 and the detection state of the first detector 102b of FIG. 1 is in a faulty state.

In the first signal processing operation 308, when the first controller 102c of FIG. 1 determines the presence or absence of a faulty state, information about a faulty state of at least one of the turn-ON switching state of the first switching module 102a of FIG. 1 and the detection state of the first detector 102b of FIG. 1 may be communicated between the first controller 102c of FIG. 1 and the second controller 104c of FIG. 1.

In the first signal processing operation S310, when the first controller 102c of FIG. 1 determines the presence of a faulty state, the first controller 102c may transmit a signal processing command to the second controller 104c of FIG. 1 such that the second controller 104c of FIG. 1 can perform signal processing.

In the second signal processing operation S312, the second controller 104c of FIG. 1 may communicate with the first controller 102c of FIG. 1.

In this case, in the second signal processing operation S312, when the second controller 104c of FIG. 1 communicates with the first controller 102c of FIG. 1, the second controller 104c of FIG. 1 may determine whether the signal processing command has been received from the first controller 102c of FIG. 1 through periodic communication with the first controller 102c of FIG. 1.

In the second signal processing operation S314, when the second controller 104c of FIG. 1 receives the signal processing command from the first controller 102c of FIG. 1, the second controller 104c of FIG. 1 may transmit the turn-ON switching command to the second switching module 104a of FIG. 1 in a manner that the second signal processor 104 of FIG. 1 can detect and process the signal of the current wheel speed information.

In the second signal processing operation S316, when the second switching module 104a of FIG. 1 receives the turn-ON switching command from the second controller 104c of FIG. 1, the current wheel speed information detected by the sensing device 10 FIG. 1 can be provided through turn-on switching of the second switching module 104a of FIG. 1.

In the second signal processing operation S318, when the second controller 104a of FIG. 1 receives the signal processing command from the first controller 102c of FIG. 1, the second controller 104c of FIG. 1 may transmit a detection command to the second detector 104b of FIG. 1 such that the second signal processor 104 of FIG. 1 can detect and process the signal of the current wheel speed information.

Thereafter, in the second signal processing operation S320, when the second controller 104c of FIG. 1 receives the detection command from the second detector 104b of FIG. 1, the second controller 104c may receive the current wheel speed information from the second detector 104b through turn-ON switching of the second switching module 104a, such that the second controller 104c may recognize the current wheel speed information.

Figure 5:
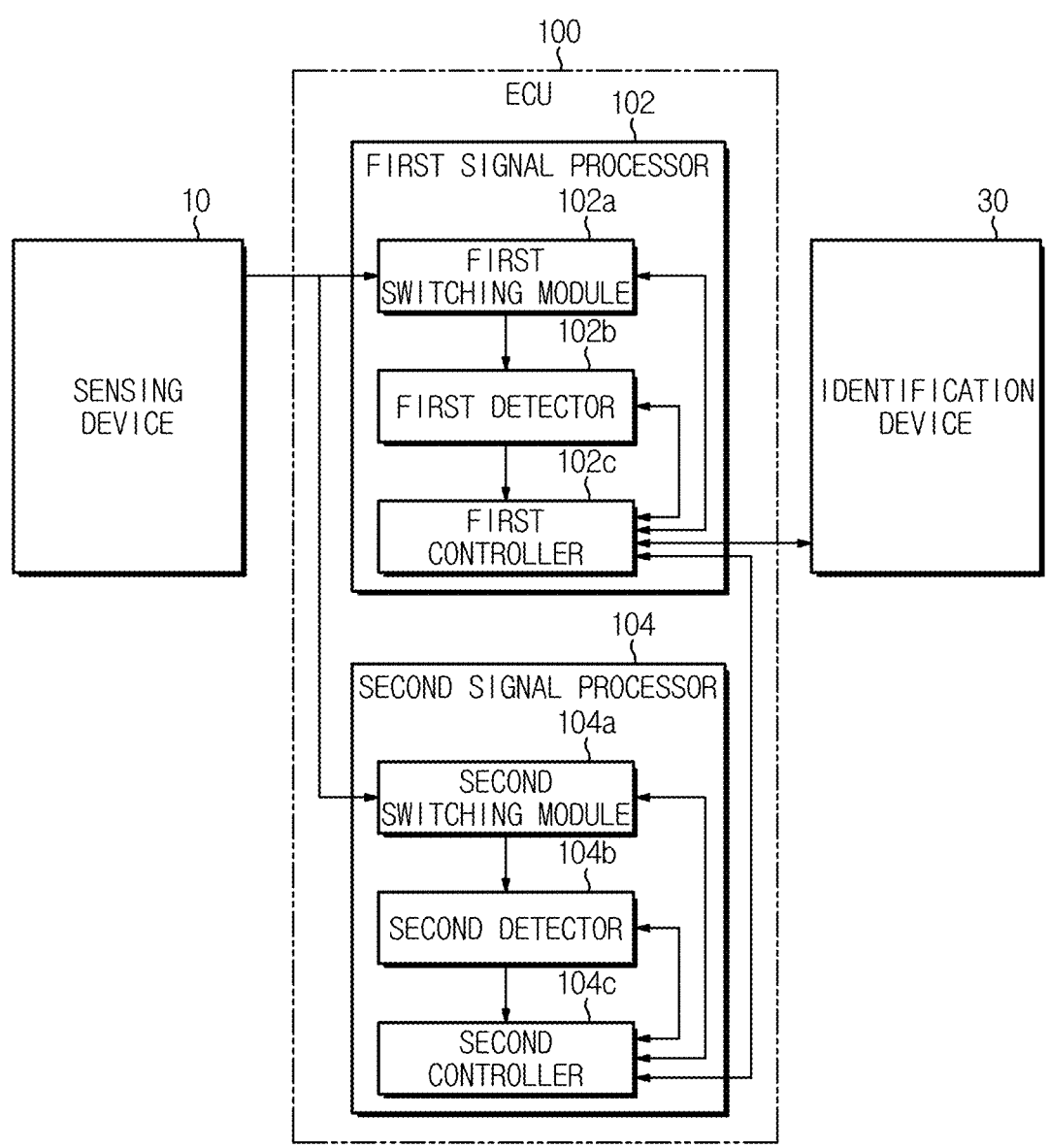
FIG. 5 is a block diagram illustrating another example of an ECU connected to both a sensing device and an identification device according to an embodiment of the present disclosure.

FIG. 5 is a block diagram illustrating another example of the ECU connected to both the sensing device and an identification device according to an embodiment of the present disclosure.

Referring to FIG. 5, when the first signal processor 102 is in the faulty state, the first controller 102c of the ECU 100 may further transmit a first identification command for identifying a faulty state of the first signal processor 102 to the identification device 30.

When the turn-ON switching state of the first switching module 102a is in the faulty state, the first controller 102c may further transmit a second identification command for identifying that the turn-ON switching state of the first switching module 102a is in the faulty state to the identification device 30.

When the detection state of the first detector 102b is in the faulty state, the first controller 102c may further transmit a third identification command for identifying that the detection state of the first detector 102b is in the faulty state to the identification device 30.

Although not shown in the drawings, the identification device 30 may include at least one of an alarm (not shown), a speaker (not shown), and a light emitting member (not shown) that allow a vehicle driver to recognize vehicle information or vehicle state information. Through operation of at least one of alarm sound of the alarm (not shown), a voice message of the speaker (not shown), and a blinking operation of the light emitting member (not shown), the identification device 30 may allow the driver to identify that the first signal processor 102 is in the faulty state, may allow the driver to identify that that the turn-ON switching state of the first switching module 102a is in the faulty state, and may also allow the driver to identify that the detection state of the first detector 102b is in the faulty state.

Although not shown in the drawings, the identification device 30 may include at least one of a Human Machine Interface (HMI) module (not shown) and a Head-Up Display (HUD) module (not shown) that are embedded to perform interfacing between a user and a machine such that the driver serving as the user can recognize vehicle information or vehicle state information. Through operation of at least one of a HMI message display operation of the HMI module (not shown) and a HUD message display operation of the HUD module (not shown), the identification device 30 may identify a faulty state of the first signal processor 102, may identify that the turn-ON switching state of the first switching module 102a is in the faulty state, and may also recognize that the detection state of the first detector 102b is in the faulty state.

Figure 6:
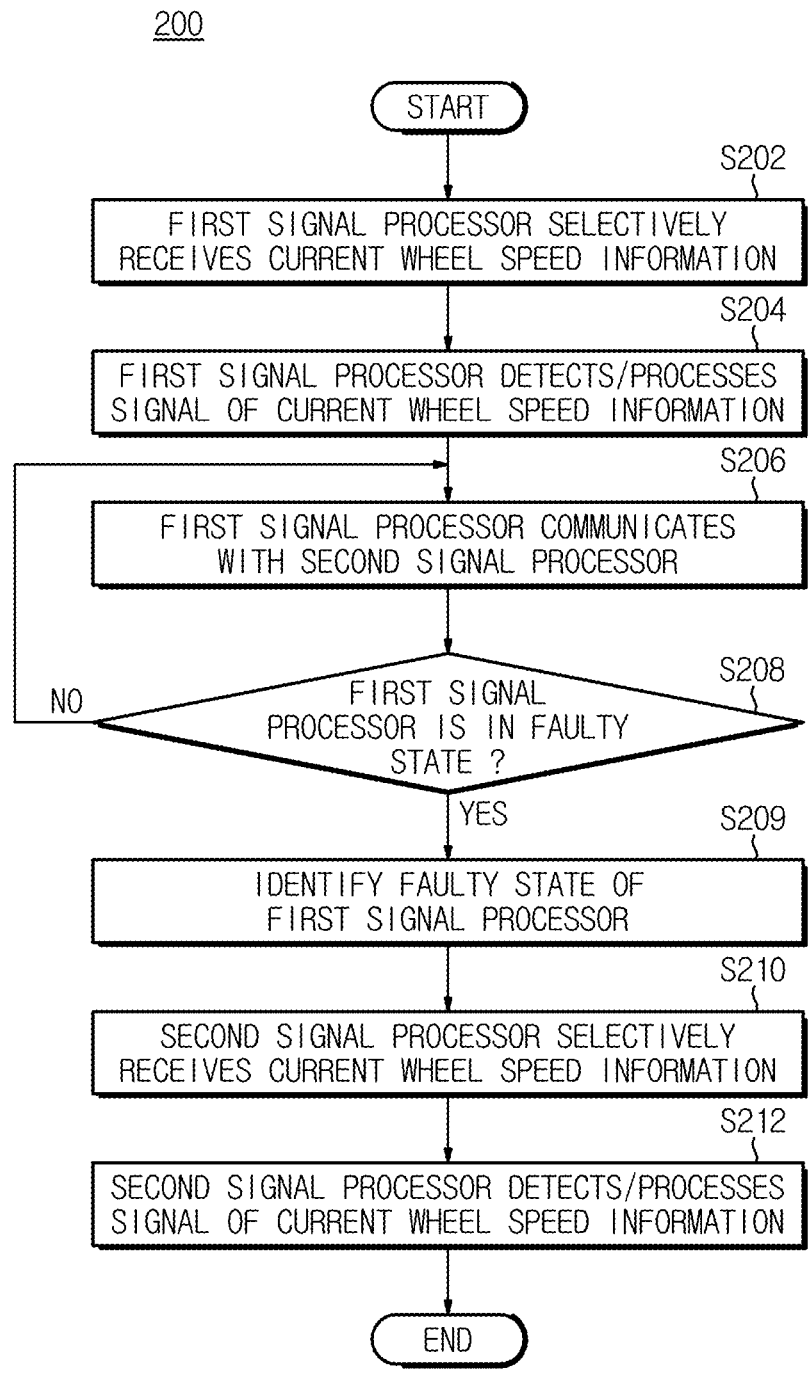
FIG. 6 is a flowchart illustrating another example of a method for operating the ECU according to an embodiment of the present disclosure.
Figure 7:
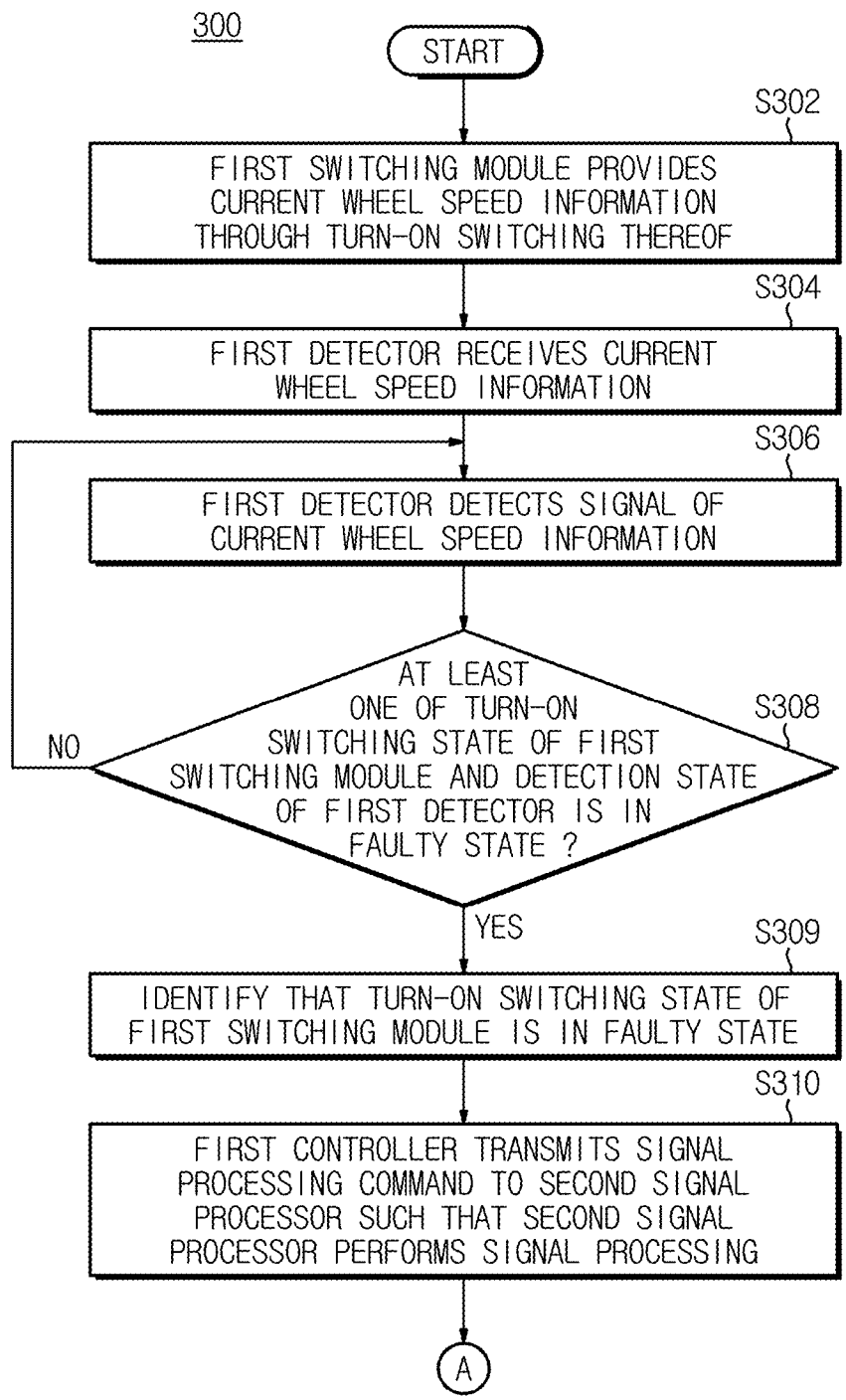
FIG. 7 is a flowchart illustrating another example of a method for operating the ECU according to an embodiment of the present disclosure.
Figure 8:
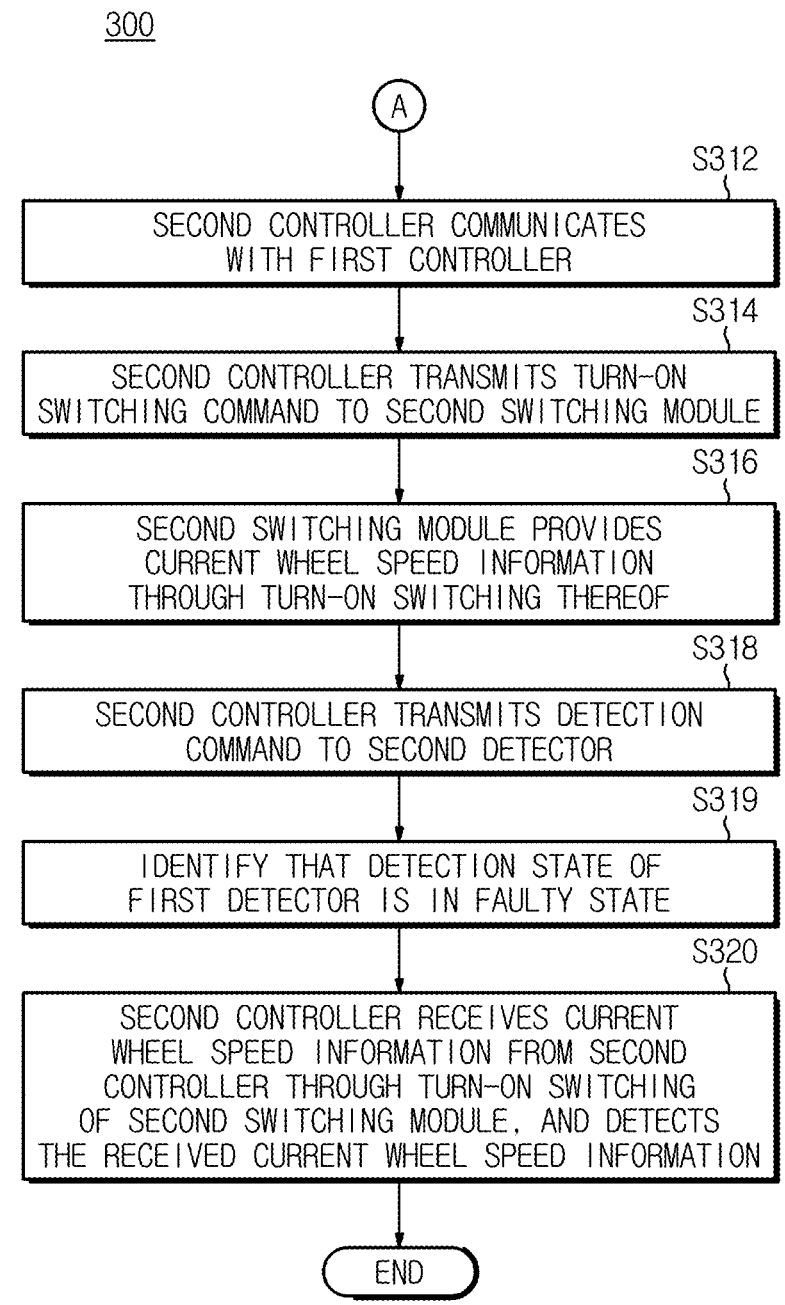
FIG. 8 is a flowchart illustrating another example of a method for operating the ECU according to an embodiment of the present disclosure.

FIG. 6 is a flowchart illustrating another example of a method for operating the ECU according to an embodiment of the present disclosure. FIG. 7 is a flowchart illustrating another example of a method for operating the ECU according to an embodiment of the present disclosure. FIG. 8 is a flowchart illustrating another example of a method for operating the ECU according to an embodiment of the present disclosure.

Referring to FIGS. 6 to 8, a method 200 for operating the ECU may include a first identification operation S209, and a method 200 for operating the ECU may include a second identification operation S309 and a third identification operation S319.

The first identification operation S209 may be carried out between the second signal processing operations S208 and S210.

In another example, although not shown in the drawings, the first identification operation S209 may be carried out while being synchronized with the second signal processing operation S210.

In the first identification operation S209, when the second signal processor 104 of FIG. 5 determines a faulty state of the first signal processor 102 of FIG. 5, the second signal processor 104 may transmit a first identification command for identifying that the first signal processor 102 of FIG. 5 is in the faulty state to the identification device 30 of FIG. 5.

The second identification operation S309 may be carried out between the second signal processing operations S308 and S310.

In another example, although not shown in the drawings, the second identification operation S309 may be carried out while being synchronized with the second signal processing operation S310.

In the second identification operation S309, when the first controller 102c of FIG. 5 determines that the turn-ON switching state of the first switching module 102a of FIG. 5 is in a faulty state, the first controller 102c may transmit a second identification command for identifying that the turn-ON switching state of the first switching module 102a of FIG. 5 is in the faulty state to the identification device 30 of FIG. 5.

The third identification operation S319 may be carried out between the second signal processing operations S318 and S320.

In another example, although not shown in the drawings, the third identification operation S319 may be carried out while being synchronized with the second signal processing operation S320.

In the third identification operation S319, when the first controller 102c of FIG. 5 determines that the detection state of the first detector 102b of FIG. 5 is in a faulty state, the first controller 102c may transmit a third identification command for identifying that the detection state of the first detector 102b of FIG. 5 is in the faulty state to the identification device 30 of FIG. 5.

Meanwhile, although not shown in the drawings, the ECU 100 according to one embodiment may be applied to at least one of an Electronic Stability Control (ESC) device (not shown), an Anti-lock Brake System (ABS) device (not shown), a Traction Control System (TCS) device (not shown), an Electronic Parking Brake (EPB) device (not shown), and an Integrated Dynamic Brake (IDB) device (not shown). The IDB device may enable boosting power and brake power to be generated by only one motor.

In this case, the ESC device (not shown) may be at least one of an Automatic Vehicle Hold (AVH) device (not shown) and a Hill Start Assist (HSA) device (not shown).

The ECU 100 may include the first signal processor 102 and the second signal processor 104. The method 200 for operating the ECU 100 may include the first signal processing operations S202 and S204 and the second signal processing operations S206 to S212. The method 300 for operating the ECU 100 may include the first signal processing operations S302 to S310 and the second signal processing operations S312 to S320.

Therefore, according to the method 200 or 300 for operating the ECU 100, when the first signal processor 102 is in a faulty state, the second signal processor 104 may selectively receive current wheel speed information detected by the sensing device 10, and the second signal processor 104 may detect and process a signal of the current wheel speed information.

Accordingly, since the method 200 or 300 for operating the ECU 100 according to one embodiment can stably operate the ECU 100, vehicle control can be stably maintained, such that it is possible to prevent occurrence of traffic accidents in advance.

The ECU 100 may include the first signal processor 102 and the second signal processor 104. The method 200 or 300 for operating the ECU 100 may allow information about at least one of the turn-ON switching state of the first switching module 102a and the detection state of the first detector 102b to be communicated between the first signal processor 102 and the second signal processor 104.

Therefore, since the method 200 or 300 for operating the ECU 100 can allow the ECU 100 to more stably operate at higher speed, vehicle control can be more stably maintained at higher speed, such that it is possible to prevent occurrence of traffic accidents in advance.

The ECU 100 may include the first controller 102c, such that the method 200 for operating the ECU 200 may further perform the first identification operation S209 and the method 300 for operating the ECU 200 may further perform the second identification operation S309 and the third identification operation S319.

Therefore, the ECU 100 and the method 200 or 300 for operating the ECU 100 may allow the driver to recognize a faulty state of the first signal processor 102.

As a result, the ECU 100 and the method 200 or 300 for operating the ECU 100 according to the embodiment may reduce a maintenance time needed to repair and maintain the first signal processor 102, such that it is possible to prevent maintenance costs from increasing.

As is apparent from the above description, the ECU and the method for operating the same according to the embodiment may stably control a vehicle and may maintain such stable control of the vehicle.

The ECU and the method for operating the same according to the embodiment may prevent occurrence of traffic accidents in advance.

The ECU and the method for operating the same according to the embodiment may suppress increase in maintenance costs.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic control unit (ECU) comprising:
   a first signal processor configured to selectively receive current wheel speed information detected by a sensing device, detect a signal of the current wheel speed information, and process the detected signal; and
   a second signal processor configured to communicate with the first signal processor, selectively receive the current wheel speed information detected by the sensing device when the first signal processor is in a faulty state, and detect and process the signal of the current wheel speed information,
   wherein the first signal processor comprises:
   a first switching module configured to provide the current wheel speed information detected by the sensing device through turn-ON switching thereof;

a first detector configured to receive the current wheel speed information through the turn-ON switching of the first switching module, and detect the signal of the current wheel speed information; and a first controller configured to transmit a turn-ON switching command to the first switching module, transmit a detection command to the first detector, determine whether at least one of a turn-ON switching state of the first switching module and a detection state of the first detector is in the faulty state, and transmit a signal processing command to the second signal processor when the at least one of the turn-ON switching state of the first switching module and the detection state of the first detector is in the faulty state, such that the second signal processor performs signal processing.

2. The electronic control unit (ECU) according to claim 1, wherein information about a faulty state of at least one of a turn-ON switching state of a first switching module and a detection state of a first detector is communicated between the second signal processor and the first signal processor,
wherein the turn-ON switching state of the first switching module and the detection state of the first detector are provided to the first signal processor.

3. The electronic control unit (ECU) according to claim 1, wherein:
when the first signal processor is in a faulty state, the first controller further transmits a first identification command for identifying the faulty state of the first signal processor, to an identification device.

4. The electronic control unit (ECU) according to claim 1, wherein:
when the turn-ON switching state of the first switching module is in the faulty state, the first controller further transmits a second identification command for identifying that the turn-ON switching state of the first switching module is in the faulty state, to an identification device.

5. The electronic control unit (ECU) according to claim 1, wherein:
when the detection state of the first detector is in the faulty state, the first signal further transmits a third identification command for identifying that the detection state of the first detector is in the faulty state, to an identification device.

6. The electronic control unit (ECU) according to claim 1, wherein the second signal processor comprises:
a second switching module configured to provide the current wheel speed information detected by the sensing device through turn-ON switching thereof;
a second detector configured to receive the current wheel speed information through the turn-ON switching of the second switching module, and detect the signal of the current wheel speed information; and
a second controller configured to communicate with the first controller, and transmit a turn-ON switching command to the second switching module while simultaneously transmitting a detection command to the second detector upon receiving the signal processing command from the first controller, such that the second controller detects and processes the signal of the current wheel speed information.

7. The electronic control unit (ECU) according to claim 6, wherein the second signal processor is configured to determine whether the signal processing command has been received from the first controller by periodically communicating with the first controller.

8. A method for operating an electronic control unit (ECU) comprising:
selectively receiving, by a first signal processor, current wheel speed information detected by a sensing device;
detecting and processing, by the first signal processor, a signal of the current wheel speed information;
communicating, by the first signal processor, with the second signal processor;
selectively receiving, by the second signal processor, current wheel speed information detected by the sensing device when the first signal processor is in a faulty state;
detecting and processing, by the second signal processor, the signal of the current wheel speed information;
providing the current wheel speed information detected by the sensing device through turn-ON switching of a first switching module of the first signal processor;
receiving the current wheel speed information from a first detector of the first signal processor through turn-ON switching of the first switching module;
detecting, by the first detector, the signal of the current wheel speed information;
determining, by a first controller of the first signal processor, whether at least one of a turn-ON switching state of the first switching module and a detection state of the first detector is in a faulty state; and
when the faulty state is decided by the first controller, transmitting, by the first controller, a signal processing command to the second signal processor such that the second signal processor performs signal processing.

9. The method according to claim 8, further comprising:
when the first controller determines a presence or absence of the faulty state, communicating information about a faulty state of at least one of the turn-ON switching state of the first switching module and the detection state of the first detector between a first controller of the first signal processor and a second controller of the second signal processor,
wherein the turn-ON switching state of the first switching module and the detection state of the first detector are provided to the first signal processor.

10. The method according to claim 8, further comprising:
when the first signal processor is in a faulty state, transmitting a first identification command for identifying the faulty state of the first signal processor, to an identification device.

11. The method according to claim 8, further comprising:
when the turn-ON switching state of the first switching module is in the faulty state, transmitting a second identification command for identifying that the turn-ON switching state of the first switching module is in the faulty state, to an identification device.

12. The method according to claim 8, further comprising:
when the detection state of the first detector is in the faulty state, the first signal further transmits a third identification command for identifying that the detection state of the first detector is in the faulty state, to an identification device.

13. The method according to claim 8, further comprising:
communicating, by a second controller of the second signal processor, with the first controller;
when the second controller receives the signal processing command from the first controller, transmitting, by the second controller, a turn-ON switching command to a second switching module of the second signal processor such that the second signal processor detects and processes the signal of the current wheel speed information;

when the second switching module receives a turn-ON switching command from the second controller, providing, by the second switching module, the current wheel speed information detected by the sensing device through turn-ON switching thereof;

when the second controller receives the signal processing command from the first controller, transmitting, by the second controller, a detection command to a second detector of the second signal processor such that the second signal processor detects and processes the signal of the current wheel speed information; and when the second detector receives the detection command, receiving, by the second detector, the current wheel speed information through turn-ON switching of the second switching module, and detecting the received current wheel speed information.

14. The method according to claim 13, further comprising:

when the second controller communicates with the first controller, determining, by the second controller, whether the signal processing command has been received from the first controller through periodic communication between the second controller and the first controller.

* * * * *